July 18, 1961 H. GARBOLINO 2,992,506
FISHING-ROD YARN GUIDE RING
Filed Sept. 18, 1959
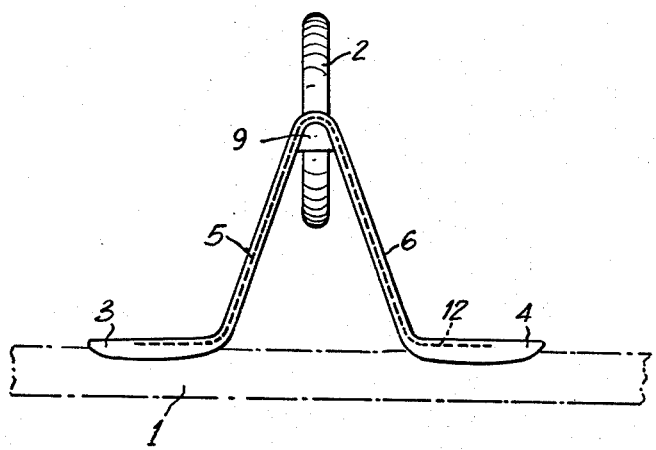
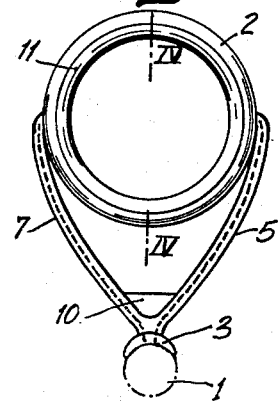
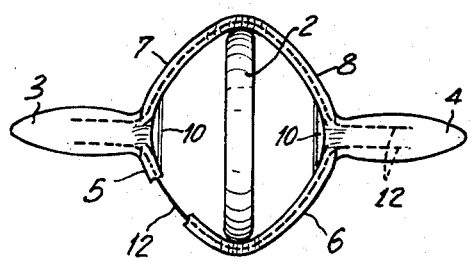
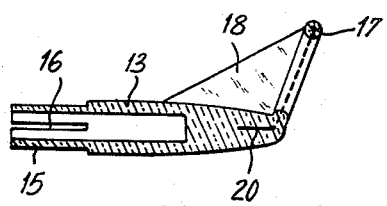
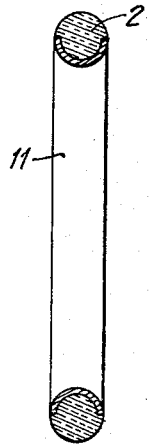
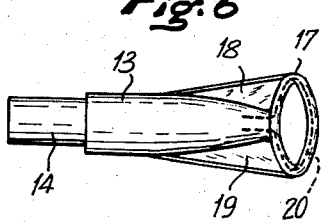
INVENTOR
HENRI GARBOLINO
By Linton and Linton
ATTORNEYS

United States Patent Office 2,992,506
Patented July 18, 1961

2,992,506
FISHING-ROD YARN GUIDE RING
Henri Garbolino, 87 Rue de la Liberation,
Ecouen, France
Filed Sept. 18, 1959, Ser. No. 840,870
Claims priority, application France Sept. 19, 1958
2 Claims. (Cl. 43—24)

This invention relates in general to fishing rods and has specific reference to a yarn-guide ring therefor which is adapted to meet the requirements of appearance, lightness in weight, strength, non-deformability and resistance to wear and tear and capable of being manufactured at a low cost in a single operation by molding from a suitable plastic material.

For the sake of appearance, lightness and strength, the yarn-guide ring is usually given a somewhat standard configuration comprising a ring-shaped portion forming the guide eye, two lugs adapted to be secured on the fishing rod by whipping, and wire-like oblique stays connecting each lug to the opposite ends of one diameter of the eye, the latter being somewhat spaced from the rod in certain cases.

Experience teaches that this member, including its wire-like stays can be molded from adequate plastic material and that the guide ring thus obtained is completely satisfactory from the multiple point of view of appearance, lightness, and resistance to deterioration, notably if the eye has its internal face lined with a suitable hard material resistant to wear and tear. However, the choice of this plastic material may constitute a difficult problem, for if it is too rigid the ring may break too easily, whereas a flexible material may allow the ring to undergo undesired changes in shape when subjected to certain stresses tending to flatten, bend or twist it, notably during the transport of the fishing rod.

According to this invention, it has been found that it is possible to impart a satisfactory rigidity to a ring of flexible plastic material or avoid the fragility of the hard plastic ring by embedding therein, during the molding operation, a reinforcement consisting of a relatively stiff wire, and that then wirelike portions can be molded without inconvenience on this reinforcement.

As the eye is usually rendered sufficiently stiff and resistant by the hard coating formed on its inner face, the structure according to this invention can be obtained by simply embedding metal wire reinforcements in the stays during the molding operation, these reinforcements being provided if desired with lug-forming extensions to be subsequently secured by whipping or otherwise on the fishing rod.

However, in the case of a yarn-guide ring for the top piece or tip of a fishing rod, which actually lies in close vicinity of the thin end of the rod, the reinforcement is embedded in the eye of this ring and its extension is embedded in the body of the support fitting on the tip of the fishing rod in order to reinforce the connection between the eye and the body.

According to a complementary feature of this invention, the metal wire utilized as an inner reinforcement may consist of a wire already coated with a plastic lining for example of a material adapted to merge into the plastic material utilized during the molding operation. By using a precoated reinforcement the adherence between the molded material and the reinforcement is improved and in addition the reinforcing wire has a surface protection even in case it were not completely embedded or lined with the molded material. Besides, if the reinforcing wire coating material and the molding material are selected to have the same color any portion of the reinforcing wire which may have been left bare after the molding operation will remain invisible and will not compromise the resistance to wear and tear of the part and its reinforcement.

The yarn guide ring according to this invention is also characterized by further advantageous features summarized hereafter.

It may firstly be pointed out that in spite of the rigidity of the ring assembly the lugs secured on the fishing rod accommodate the curvature of the fishing rod sections by having its shape somewhat altered accordingly, whereby these sections are not subjected to surface deteriorations likely, notably in the case of tubular rods of stratified glass fiber, to become the seat of incipient ruptures at the fixation points of these yarn-guide rings.

This inherent flexibility of the lugs is also advantageous in that it prevents any undesired shocks received by the rings from being transmitted to the whippings or other fixation means and causing their loosening as frequently observed in the case of metal rings.

In the case of metal fishing rods, the use of plastic rings avoids the electric cell effect occurring between two different metals in contact with each other when metal rings are used, this effect being particularly noticeable in salt air of the ocean and leading to a relatively rapid disintegration of the rod sections, which cannot be avoided unless the contacting elements are electrically insulated from one another.

Finally, the lugs of the plastic ring are given their final shape by molding, whereas the lugs of metal rings had to be processed twice for imparting the transverse curvature thereto and grinding their ends.

The novel advantages resulting from the yarn-guide ring construction according to this invention are obvious with any fishing rods to be provided with yarn-guide rings. In the case of flexible and medium-force fishing rods, the weight of these guide rings constitute a particularly important problem. In fact, the greater the rod flexibility, the higher the number of guide rings to be provided therealong, in order properly to guide the yarn both when casting and winding in the line, but the weight of the rings is detrimental in that it reduces the "springiness" or action of the fishing rod. On the other hand, with conventional reels of the "fixed drum" type, wherein the line is delivered in the axial direction, it is necessary to use guide rings relatively spaced from the fishing rod and therefore the latter must have a relatively large cross section in order to increase its strength, thus leading to relatively important weight problem in the case of metal rings. Now the weight of a ring according to this invention may be of the order of about one-third of the weight of a metal ring of same size, so that the number of rings may be increased without interfering with the springiness of the rod.

In order to afford a clearer understanding of this invention and of the manner in which the same may be carried out in the practice, reference will now be made to the accompanying drawings forming part of this specification and illustrating diagrammatically by way of example a few typical forms of embodiment of the invention. In the drawings:

FIGURE 1 is a lateral view of the ring to be fastened on a fishing rod shown only in chain dotted lines;

FIGURE 2 is a front view of the ring shown in FIG. 1;

FIGURE 3 is a plan view from beneath;

FIGURE 4 is an axial section taken upon the line IV—IV of FIG. 2 and showing on a larger scale the eye of the ring;

FIGURE 5 is an axial section showing a tip ring, and

FIGURE 6 is a plan view from above of the tip ring of FIG. 5.

Referring first to FIG. 1 of the drawings, the reference numeral 1 designates the fishing rod shown only in chain-dotted lines and on which the yarn-guide ring may be fastened by its lugs by means of whippings or any other adequate method.

The ring assembly comprises an eye 2, lugs 3, 4 and each lug is connected through stays 5, 7 and 6, 8 respectively to two opposite points of the ring which lie on its diameter at right angles to the axis of the fishing rod.

The assembly is obtained by embedding, during the molding operation, reinforcements of relatively stiff metal wire in a suitable plastic material. By molding the piece completely all the portions thereof, and notably the lugs, can easily be given their desired final configuration. At the junction of the stays 5, 6 and 7, 8 gusset-like walls 9 may be formed by molding in the bent portions of these stays. Similar walls 10 may be also formed between the stays 5, 7 and and 6, 8 in the region thereof adjacent to their junction with the lugs 3, 4.

In the example illustrated, the eye 2 is molded around a relatively hard ring 11 for example of stiff hard metal, this ring 11 having if desired a semi-circular radial contour to constitute the inner surface of the eye. The other, wire-like portions of the ring are reinforced by elements 12 embedded by molding. Thus, these reinforcements may consist of cold-drawn stainless steel wire of the so-called piano-wire type. Thus, in the ring illustrated, two reinforcing wires of this type can be used, one wire being embedded in one fraction of the lug 3, in the stays 5, 6 and in one fraction of lug 4, whereas the other wire is embedded in one fraction of the wire 3 so as to lie parallel to the preceding wire, then in stays 7, 8 and finally in one fraction of the wire 4 also parallel to the preceding wire.

The top-piece or rod-tip yarn-guide ring illustrated in FIGS 5 and 6 of the drawings comprises a body 13 formed with a rear end portion 14 of reduced outer diameter for securing it on the tip of the rod. The body 13 and its portion 14 are formed with an inner cavity 15 adapted to receive the tip of the rod, and the portion 14 may be split longitudinally as at 16 to improve the safety of the fixation between the top-piece and the rod tip engaged in the aforesaid cavity 15.

The body 13 and its tubular split portion 14 are molded integrally from plastic material and formed with an integral end eye 17 connected to the body 13 by stay ribs 18, 19 also formed integrally by molding. During the molding operation a reinforcement in the form of a metal wire 20 may be embedded to reinforce the fixation of the eye 17 on the body 13. To this end, the wire is curved so as to be embedded in the complete periphery of the eye 17, its two ends being embedded and anchored in the end portion of the body 13 which is adjacent to the eye.

Moreover, this eye 17 may be reinforced by an internal ring having for example the cross-sectional shape of the ring shown in FIG. 4.

Of course, many modifications may be brought to the forms of embodiment shown and described herein, without departing from the spirit and scope of the invention as set forth in the appended claims.

I claim:

1. A yarn guide ring for flexible fishing rods comprising a one-piece molded plastic guide eye and support, said support being provided by thin stays extending from the periphery of said eye and of a configuration for being mounted on said fishing rod and attaching, but spacing said eye therefrom and a thin relatively stiff but elastic metal wire embedded in and extending lengthwise of said stays.

2. A yarn guide ring for flexible fishing rods as claimed in claim 1, wherein a stiff metal ring is fixedly mounted on the inner periphery of said guide eye and extends therearound.

References Cited in the file of this patent

UNITED STATES PATENTS 2,878,608 O'Brien _____ Mar. 24, 1959

FOREIGN PATENTS 490,935 Great Britain _____ Aug. 23, 1938
1,169,454 France _____ Sept. 8, 1958